United States Patent
Dinh et al.

(10) Patent No.: US 11,514,347 B2
(45) Date of Patent: Nov. 29, 2022

(54) IDENTIFYING AND REMEDIATING SYSTEM ANOMALIES THROUGH MACHINE LEARNING ALGORITHMS

(71) Applicant: Dell Products L.P., Round Rock, TX (US)

(72) Inventors: Hung Dinh, Austin, TX (US); Pravash Ranjan Panda, Rourkela (IN); Prince Mathew, Kelara (IN); Tousif Mohammed, Bangalore (IN); Sabu Syed, Austin, TX (US); Jatin Kamlesh Thakkar, Bangalore (IN); Naveen Silvester Muttikal Thomas, Bangalore (IN); John K. Maxi, New Orleans, LA (US)

(73) Assignee: Dell Products L.P., Round Rock, TX (US)

( * ) Notice: Subject to any disclaimer, the term of this patent is extended or adjusted under 35 U.S.C. 154(b) by 917 days.

(21) Appl. No.: 16/265,171

(22) Filed: Feb. 1, 2019

(65) Prior Publication Data
US 2020/0250559 A1 Aug. 6, 2020

(51) Int. Cl.
*G06N 5/04* (2006.01)
*H04L 41/147* (2022.01)
*G06N 20/00* (2019.01)
*H04L 41/16* (2022.01)
*H04L 41/0823* (2022.01)
*H04L 41/0631* (2022.01)

(52) U.S. Cl.
CPC ............. *G06N 5/046* (2013.01); *G06N 20/00* (2019.01); *H04L 41/0631* (2013.01); *H04L 41/0836* (2013.01); *H04L 41/147* (2013.01); *H04L 41/16* (2013.01)

(58) Field of Classification Search
CPC ............. H04L 41/0631; H04L 41/0636; H04L 41/0836; H04L 41/147; H04L 41/16; G06N 5/046; G06N 20/00
See application file for complete search history.

(56) References Cited

U.S. PATENT DOCUMENTS 9,665,420 B2    5/2017    Jilani
10,048,996 B1 *    8/2018    Bell ................... G06F 11/3006
(Continued)

*Primary Examiner* — Nam T Tran
(74) *Attorney, Agent, or Firm* — Ryan, Mason & Lewis, LLP

(57) ABSTRACT

Methods, apparatus, and processor-readable storage media for identifying and remediating anomalies through cognitively assorted machine learning algorithms are provided herein. A computer-implemented method includes: identifying, using system log data, a target variable based at least in part on correlations between a set of performance indicators of a system and the target variable, and threshold values for the performance indicators relative to the target variable; generating an inference model to predict when the system will enter an adverse state and identify one or more root causes of the system entering the adverse state; using machine reinforcement learning to determine an action policy including actions that remediate the adverse state; predicting that the system will enter the adverse state by applying the inference model to further system log data; and automatically executing one or more actions of the action policy in response to the prediction.

20 Claims, 5 Drawing Sheets

(56) References Cited

U.S. PATENT DOCUMENTS

| | | | |
|---|---|---|---|
| 10,354,332 B2* | 7/2019 | Trainor | G06Q 40/08 |
| 10,355,938 B2* | 7/2019 | Saha | H04L 41/12 |
| 10,410,135 B2* | 9/2019 | Shumpert | G06N 20/00 |
| 10,613,962 B1* | 4/2020 | Delange | H04L 41/147 |
| 2015/0095718 A1* | 4/2015 | Otsuka | G06N 20/00 |
| | | | 714/47.3 |
| 2016/0088006 A1* | 3/2016 | Gupta | H04L 41/16 |
| | | | 726/23 |
| 2016/0342453 A1 | 11/2016 | Khan et al. | |
| 2017/0153936 A1 | 6/2017 | Vorganti | |
| 2018/0083825 A1 | 5/2018 | Prabhakara et al. | |
| 2018/0189667 A1* | 7/2018 | Tsou | G06N 20/00 |
| 2019/0044825 A1* | 2/2019 | Vijayakumar | H04L 41/147 |
| 2019/0294484 A1* | 9/2019 | Luo | G06N 20/00 |
| 2019/0349273 A1* | 11/2019 | Rikovic Tabak | H04L 41/16 |
| 2020/0117528 A1* | 4/2020 | Davelman | H04L 41/0631 |

* cited by examiner

IDENTIFYING AND REMEDIATING SYSTEM ANOMALIES THROUGH MACHINE LEARNING ALGORITHMS

FIELD

The field relates generally to information processing systems, and more particularly to data management techniques in such systems.

BACKGROUND

Information technology (IT) operations generally rely on engineers to identify and remediate issues related to computer infrastructure, platforms, software applications and services. Existing monitoring and logging tools can help identify such issues but generally do not capture the information associated with remediation actions performed by the engineers. Additionally, human-driven remediation can be inconsistent and time-consuming, which can negatively affect platform availability and increase support costs.

SUMMARY

Illustrative embodiments of the disclosure provide techniques for identifying and remediating system anomalies through cognitively assorted machine learning algorithms. An exemplary computer-implemented method includes identifying, using a first set of system log data, a target variable based at least in part on one or more linear correlations between a set of performance indicators of a system and the target variable, and one or more threshold values for each of the performance indicators relative to the target variable. The method also includes generating an inference model to predict when the system will enter one or more adverse states based at least on a given value of the target variable and to identify one or more root causes of the system entering the adverse states based on at least a subset of the set of performance indicators, wherein the generating comprises generating a linear model and a non-linear model based on at least a portion of the first set of system log data. Additionally, the method includes using machine reinforcement learning to determine an action policy comprising one or more actions that at least partially remediate the one or more adverse states. The method also includes predicting that the system will enter at least one of the adverse states by applying the inference model to a second set of system log data. Further, the method includes automatically executing one or more actions of the action policy in response to the prediction.

Illustrative embodiments can provide significant advantages relative to conventional support techniques such as providing accurate identification of system anomalies and corresponding root cause analysis, as well as facilitating increased reliability in system availability. For example, challenges pertaining to efficiently selecting and applying actions to remedy system anomalies are overcome by providing a context-driven and probabilistic machine learning (ML) framework that allows autonomous remediation of issues identified by the framework.

These and other illustrative embodiments described herein include, without limitation, methods, apparatus, systems and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

The exemplary embodiments herein describe techniques for identifying and remediating system anomalies through machine learning algorithms. Additional description of these techniques is presented after a system into which the exemplary embodiments may be used is described.

Figure 1:
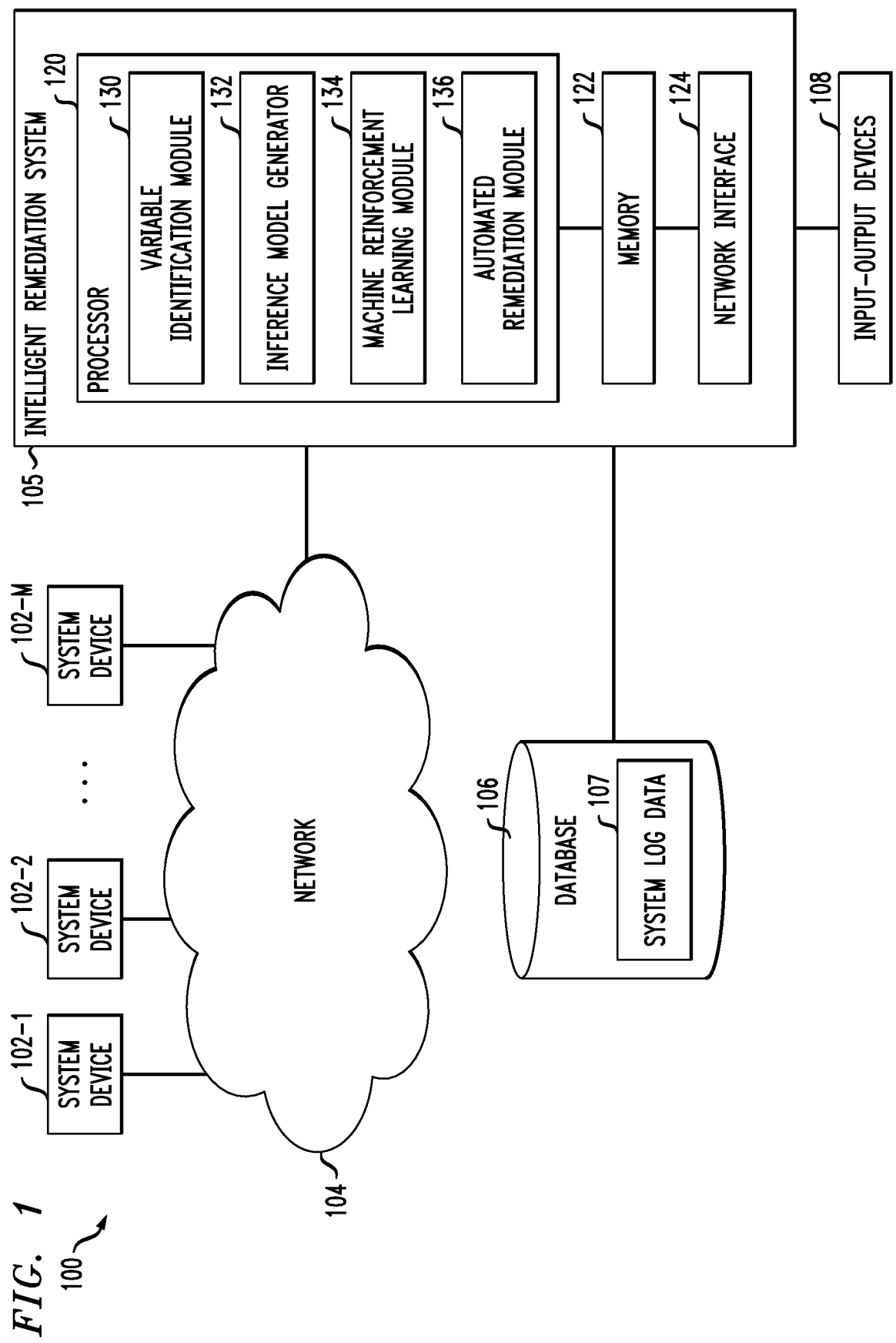
FIG. 1 shows an information processing system configured for remediating system anomalies in an illustrative embodiment.

FIG. 1 shows a computer network (also referred to herein as an information processing system) 100 configured in accordance with an illustrative embodiment. The computer network 100 comprises a plurality of system devices 102-1, 102-2, . . . 102-M, collectively referred to herein as system devices 102. The system devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is intelligent remediation system 105.

The system devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The system devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" as used herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the intelligent remediation system 105 can have an associated database 106 configured to store system log data 107 pertaining to, for example, various system performance indicators, such as information associated with usage and/or availability of processor(s), response times, timeouts, errors associated with a service-oriented architecture platform, and/or other types of system data including timestamps and other information associated with system events.

The database 106 in the present embodiment is implemented using one or more storage systems associated with the intelligent remediation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the intelligent remediation system 105 are input-output devices 108, which illustratively comprise keyboards, displays or other types of input-output devices in any combination. Such input-output devices can be used, for example, to support one or more user interfaces to intelligent remediation system 105, as well as to support communication between user the intelligent remediation system 105 and other related systems and devices not explicitly shown.

The intelligent remediation system 105 in the FIG. 1 embodiment is assumed to be implemented using at least one processing device. Each such processing device generally comprises at least one processor and an associated memory, and implements one or more functional modules for controlling certain features of the intelligent remediation system 105.

More particularly, intelligent remediation system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the intelligent remediation system 105 to communicate over the network 104 with the system devices 102, and illustratively comprises one or more conventional transceivers.

The processor 120 further comprises a variable identification module 130, an inference model generator 132, a machine reinforcement learning module 134, and an automated remediation module 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the identification module 130, inference model generator 132, machine reinforcement learning module 134, and automated remediation module 136 may be implemented at least in part in the form of software that is stored in memory 122 and executed by processor 120.

It is to be understood that the particular set of elements shown in FIG. 1 for identifying and remediating system anomalies through machine learning algorithms involving intelligent remediation system 105 and system devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing variable identification module 130, inference model generator 132, machine reinforcement learning module 134, and automated remediation module 136 of an example intelligent remediation system 105 in computer network 100 will be described in more detail with reference to the flow diagram of FIG. 5.

According to at least one embodiment, a machine learning framework is provided that includes a context-driven and probabilistic support mechanism. The ML framework helps, for example, expedite data-driven decision-making and improves monitoring and remediation systems as discussed in more detail below.

Figure 2:
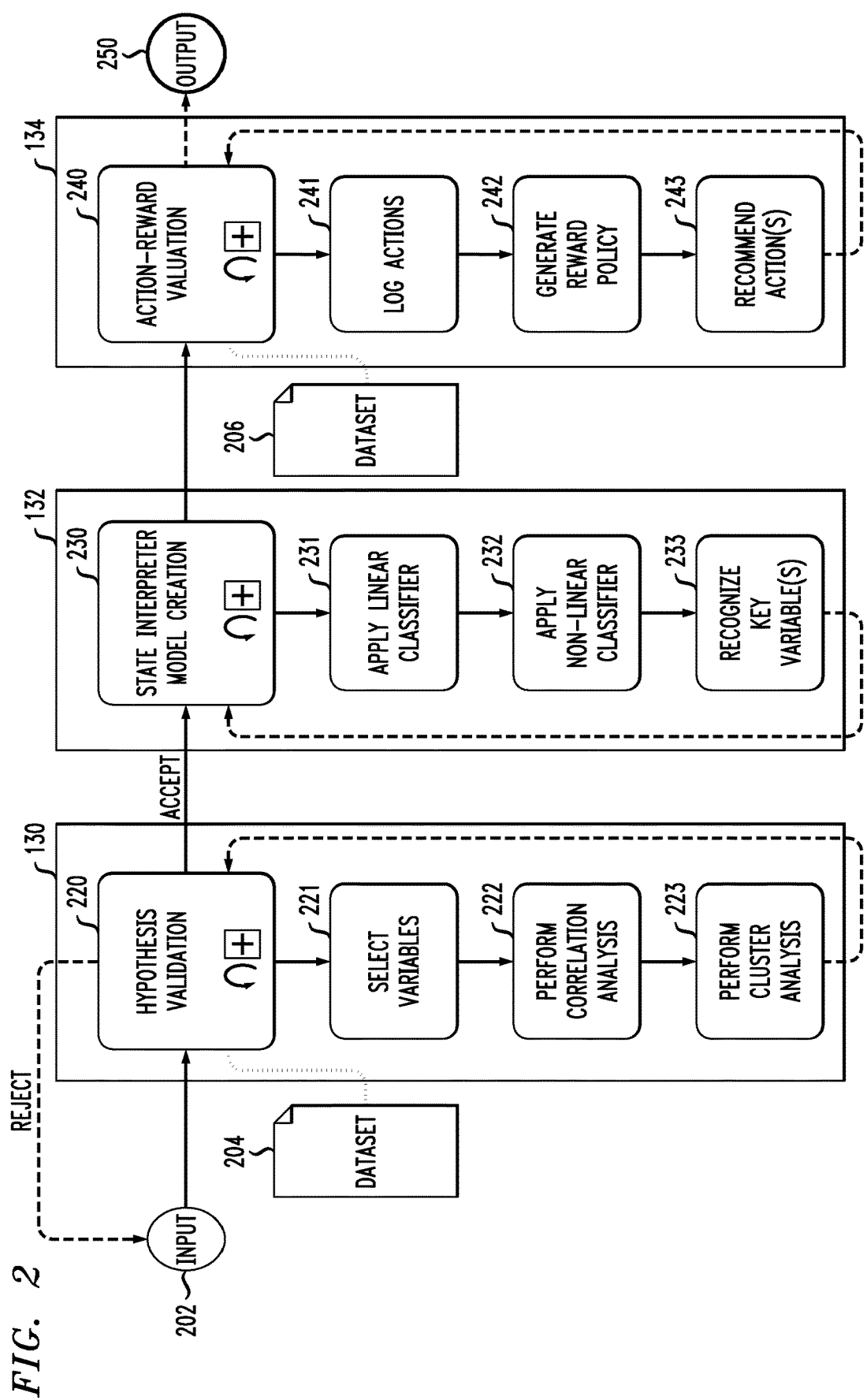
FIG. 2 shows an example machine learning framework in accordance with an illustrative embodiment.

Referring now to FIG. 2, this figure shows an example machine learning framework in accordance with an illustrative embodiment. In particular, the ML framework shown in FIG. 2 utilizes a set of machine learning algorithms to identify system anomalies and learn the effects of different actions performed to remediate these system anomalies. One or more example embodiments enable particular remediation actions to be automatically selected to remedy future system anomalies. The example framework depicted in FIG. 2 is divided into three stages, namely, hypothesis validation 220, state interpreter model creation 230, and action-reward valuation 240. The hypothesis validation 220, state interpreter model creation 230 and action-reward valuation 240 stages may correspond to, e.g., actions performed, at least in part by, the variable identification module 130, inference model generator 132, and machine reinforcement learning module 134, respectively. Each of these stages are discussed in more detail below.

The hypothesis validation 220 stage tests a given hypothesis against a dataset 204. The hypothesis validation 220 stage includes identifying a target variable from a set of variables associated with dataset 204, as indicated by block 221. Additionally, the hypothesis validation 220 stage includes performing a correlation analysis 222 between the determined target variable and the remaining variables in the dataset 204 to generate a correlation report.

In at least some embodiments, the hypothesis validation 220 stage includes a user providing a system (such as, for example, intelligent remediation system 105) with a set of performance indicators (such as, key performance indicators (KPIs), for example) and one or more target variables that are currently being monitored by the system to identify anomalous behavior based on different thresholds for the target variables. During the hypothesis validation 220 stage, the user may identify a single target variable out of the dataset 204 (which may be provided as input 202, for example) to be tested, or the system may automatically select a target variable to be tested. The remaining variables in the dataset 204 are treated as independent variables (i.e., not target variables) for defining root cause analysis when anomalous system behavior is predicted. As a non-limiting example, the dataset 204 may comprise system log data over a period of time, wherein a set of key performance indicators can be derived from the system log data. In this example, the existing monitored KPIs provide for independent variables that are, for example, hypothesized to be correlated or to possess data patterns that cause anomalous behavior in the user-identified target variable. The variable selection 221 may also include filtering the dataset 204 to, for example, remove columns of data from the dataset 204 other than the set of variables and the target variable. For example, the dataset 204 may be filtered and/or the target variable may be selected based on input (e.g., user input).

In at least one example embodiment, the correlation analysis 222 measures linear correlations between the target variable and each of the other variables. For example, the correlation analysis 222 may include a bivariate correlation analysis, and the correlation between a target variable and each of the other variables in the dataset 204 may be represented as a value between +1 and −1 based on the Cauchy-Schwarz inequality, wherein 1 indicates a total positive linear correlation, 0 indicates no linear correlation, and −1 indicates a total negative linear correlation. A correlation report is generated that includes the correlations between the target variable and each of the other variables in the dataset 204.

In at least one example embodiment, a weak linear relation between the target variable and another variable may be automatically removed from the correlation report (such as if the correlation is between −0.25 to 0.25, as merely a non-limiting example), or the system can output a recommendation to remove the weak correlations from the correlation report. Alternatively, or additionally, independent variables that have a strong linear relation may also be eliminated from the correlation report to avoid bias (such as inference bias resulting from, for example, user selection).

Additionally, the hypothesis validation 220 stage includes performing a cluster analysis 223 by applying a clustering algorithm on at least a portion of the dataset 204. Prior to performing the cluster analysis 223, one or more of the independent variables may be removed (e.g., based on user input) from the dataset 204 based on business validation of the correlation report from the correlation analysis 222. In some embodiments, the cluster analysis 223 uses a k-means clustering algorithm (which is also referred to as Lloyd's algorithm). The k-means algorithm uses an iterative refinement technique, wherein given an initial set of k-means, the algorithm proceeds by alternating between an assignment step and an update step. The algorithm converges when the assignments no longer change, thus resulting in a number, k, of clusters.

In at least one embodiment, the optimal number of clusters resulting from the cluster analysis 223 may be determined using an elbow method. For example, the k-means algorithm may be performed on the dataset 204 for a range of values of k (such as k from 1 to 11, for example). For each value of k, the within-cluster sums of squares (WCSS) is calculated, and a plot is generated with WCSS as a function of the number of clusters. The 'elbow' of this plot (e.g., the point corresponding to the maximum angle) indicates the optimal number of clusters in the dataset 204. In some example embodiments, a user may select the optimal number of clusters in response to the plot being output to the user. This selection also helps the user validate possible clusters that meet one or more business expectations. Alternatively, the optimal number of clusters may be determined automatically (e.g., without user input), such as via machine learning image processing techniques, for example.

The cluster analysis 223 results in a cluster report that includes, for example, centroids of the k clusters and labels for each item in the dataset 204; namely, each item is assigned to one of the k clusters. The cluster report provides an unsupervised view of the variables in the dataset 204 for hypothesis validation. For example, the cluster report may indicate mean performance and distribution of continuous target variable for each of the derived clusters for business validation. In some example embodiments, a recommendation is provided to the user to reject a given hypothesis depending on whether the target variable fails to imitate expected diversity.

In this way, the clustering analysis 223 efficiently accepts or rejects the base hypothesis of whether the target variable and the corresponding set of variables help deliver a particular outcome. In at least one example embodiment, a user may validate the base hypothesis in response to the cluster report being output to the user, namely, whether the identified variables help identify a state of the selected target variable.

If the hypothesis cannot be validated based on the clustering report, then the process can be repeated with, e.g., a different target variable being selected and/or different data. If the hypothesis is validated, then the validated dataset can be output as labeled training data.

Figure 3:
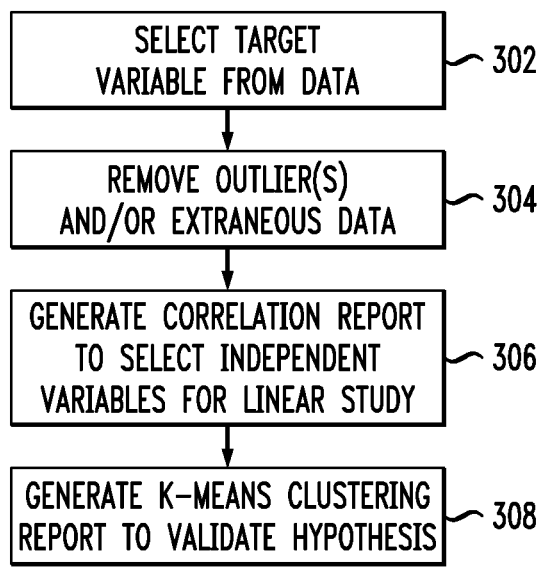
FIG. 3 shows a flow diagram of a process for hypothesis validation in accordance with an illustrative embodiment.

Referring also to FIG. 3, this figure shows a flow diagram of a process for hypothesis validation in accordance with an illustrative embodiment. A target variable is selected from a set of data as indicated in step 302. The set of data may then be processed to remove extraneous data (such as variables that are not expected to meet, or fail to meet, business expectations) and/or to identify and remove outliers as indicated in step 304.

A correlation report is generated that includes correlations between the target variable and the dependent variables in the data, as indicated in step 306. It is noted that the example depicted in FIG. 3 shows step 304 prior to step 306; however, this need not be the case, and at least a portion of the operations of step 304 may be performed following step 306 in at least some example embodiments. For example, extraneous data can be removed based at least in part on the correlation report.

A k-means clustering report is generated, and the hypothesis is either validated or rejected based on the clustering report, as indicated in step 308.

Referring again to FIG. 2, the state interpreter model creation 230 stage applies a linear classifier 231 to generate a linear model. Applying the linear classifier 231 may include, for example, fitting a logistic regression model based on the linearly correlated variables from the correlation report. The linear model thus is configured to probabilistically predict state changes of the target variable based on the values of the correlated variables. In one or more embodiments, the logistic regression includes applying a sigmoid function, which takes any real input (t=t∈₁ ℝ), and outputs a value between zero and one; for the logit, this is interpreted as taking an input log-odds and having an output probability. The logistic function may be defined, e.g., as follows:

$$\sigma(t) = \frac{e^t}{e^t + 1} = \frac{1}{1 + e^{-t}},$$

wherein e denotes the exponential function.

The model creation 230 stage also includes applying a non-linear classifier 232 to the training data to generate a non-linear model. The non-linear model is used in conjunction with the linear model to improve performance when identifying state changes in the target variable. In at least one example embodiment, the non-linear classifier comprises a random forest classifier. Random forests are a way of averaging multiple deep decision trees, trained on different parts of the same training set, with the goal of reducing the variance. This comes at the expense of a small increase in the bias and some loss of interpretability, but improves the performance when applying the final inference model for identifying state changes.

According to at least one embodiment, the linear model and the non-linear model can be combined to generate an ensemble model (which is referred to herein as an inference model) that can be used to probabilistically predict when a state change will occur and also to recognize key variables for identifying root causes associated with the states, as indicated by block 233.

The linear model and the non-linear model can be combined, for example, using at least one ensemble modeling technique which assumes the higher of the classifier probability of an anomalous state scored through both linear and non-linear model as the scale for predicted anomalous behavior. Also, in one or more embodiments, for each event that the inference model predicts as anomalous system behavior, corresponding independent variables are labeled if any independent statistical anomalous behavior is indicated for the same. Moreover, in one or more embodiments, inference techniques may include generating graphical representations and automatically determining root cause references through image processing machine learning techniques.

Figure 4:
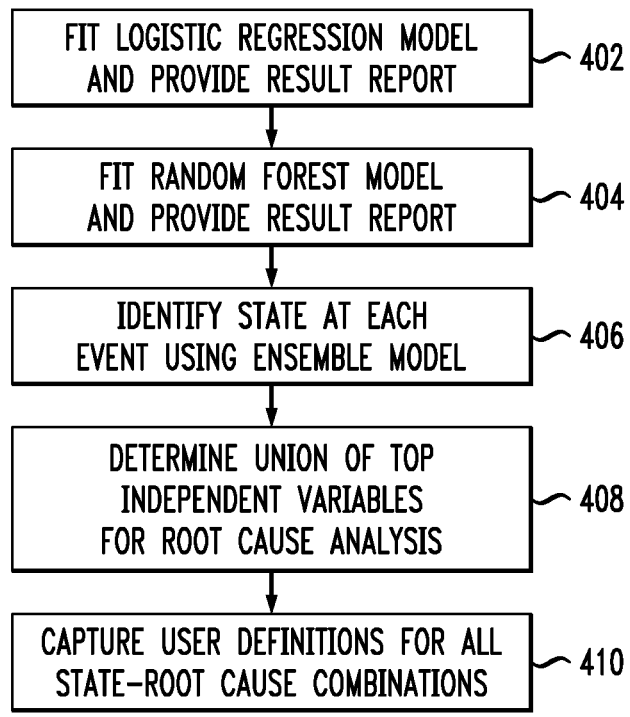
FIG. 4 shows a flow diagram of a process for state interpretation in accordance with an illustrative embodiment.

Referring also to FIG. 4, this figure shows a flow diagram of a process for state interpretation in accordance with an illustrative embodiment. A logistic regression model is fit to a set of training data (such as training data labeled as a result of a clustering report as detailed above) as indicated in step 402. A random forest model is also fit to a set of training data. In some example embodiments, the same set of training data is used to feed both the logistic regression model and the random forest model, as indicated in step 404. An ensemble model is used to predict a state for each event in the data, as indicated in step 406. A union of the top independent variables is determined for root cause analysis, as indicated in step 408. In at least one embodiment, the independent variables may be used to define a root cause analysis every time the models predict anomalous system behavior. For example, a union of a subset of the independent variables can be derived wherein the subset of variables are variables that had the greatest effect on the prediction for a particular event.

Additionally, user definitions for all state-root cause combinations are captured, as indicated in step 410. The user-definitions correspond to root cause labels provided at the time remediation actions are performed by the user, for example. These labels may help, for example, in placing the various remediation actions into different groups based on the support knowledge of the user for future reference. After the system is provided with exhaustive labels to cover all possible root cause analyses, the remediation process may be automated by automatically identifying labels for root cause analysis of each new predicted anomalous system behavior based on, e.g., image processing ML algorithms. This allows, for example, the system to automatically choose an appropriate remediation action, as the labels are tied to exclusive and relevant remediation actions from the historical data.

Referring again to FIG. 2, the action-reward valuation 240 stage applies a machine reinforcement learning methodology to learn the value of, for example, remediation actions for different states. For example, the action-reward valuation 240 stage includes receiving a further dataset 206. In some examples, dataset 204 may be a historical dataset, and dataset 206 may be a current dataset. Dataset 206 may be, for example, uploaded by a user or gathered automatically via monitoring tools (e.g., a dashboard). In some example embodiments, dataset 206 includes one or more logs (e.g., support and/or system logs) that are formatted in an 'event-action-end event' format, for example. The action-reward valuation 240 stage applies the state interpreter model (which may also be referred to as the inference model) determined in stage 230 to automatically identify different states in dataset 206, as well as root causes corresponding to the different states.

The action-reward valuation 240 stage, indicated in block 241, captures information about one or more log actions that affect one or more of the identified states. As a non-limiting example, each of the identified states may correspond to a risk probability that a system will be adversely affected. For example, the risk probability may correspond to the availability of a system, such as, for example, availability of processing, network, and/or memory resources. The one or more actions may correspond to actions performed by a support team to remediate those issues, such as by reducing the overall risk to the system. A reward valuation may be performed for each action taken to generate a state-reward policy 242 for each state-root cause combination. Each time an action is performed, the state-reward policy 242 is updated based on if, and by how much, the action successfully remediated the risk associated with the state. As a non-limiting example, the inference model may identify a start state and an end state on dataset 206, and assign each start state and each end state with a risk probability. In this way, the reward evaluation may be equal to the difference in risk probability between the start state and the end state. Some example embodiments may implement a custom reward system. For example, a custom reward system can be implemented to provide negative rewards for remediation actions which deviate from ideal remedy actions suited for a given root cause analysis. As a non-limiting example, assume an anomalous behavior is predicted that can be remediated by restarting the device in question or by a more specific process flow that is a more accurate technical solution. In this example, a custom reward for restarting the device can be assigned a relatively lower reward such that it is not selected over the more accurate technical solution for the anomalous event.

The action-reward valuation 240 stage also includes recommending action(s) 243 for states identified in the future based on the action-reward policy. In at least one embodiment, the action-reward policy continually gains knowledge on how to identify and remediate anomalies in the system.

As also depicted in FIG. 2, one or more of the recommended actions 250 may be output to a user (e.g., a system engineer) to help remediate the anomaly. In at last one example embodiment, the recommended actions are performed automatically in response to an anomaly being anticipated and/or detected.

The ML framework depicted in FIG. 2 may be implemented, for example, as a framework-as-a-service that can used across various available Enterprise Integration Services (EISs). These EISs may, for example, span hundreds of virtual machines (VMs) that are used to process millions of transactions daily. Additionally, in at least one example embodiment, the ML framework may be implemented for a specific service, such as a distributed file system hosted on a service-oriented architecture (SOA) platform. It is to be appreciated that such a ML framework can also be applied to many other use cases, such as situations that currently use monitoring alerts, dashboards and/or support systems.

Figure 5:
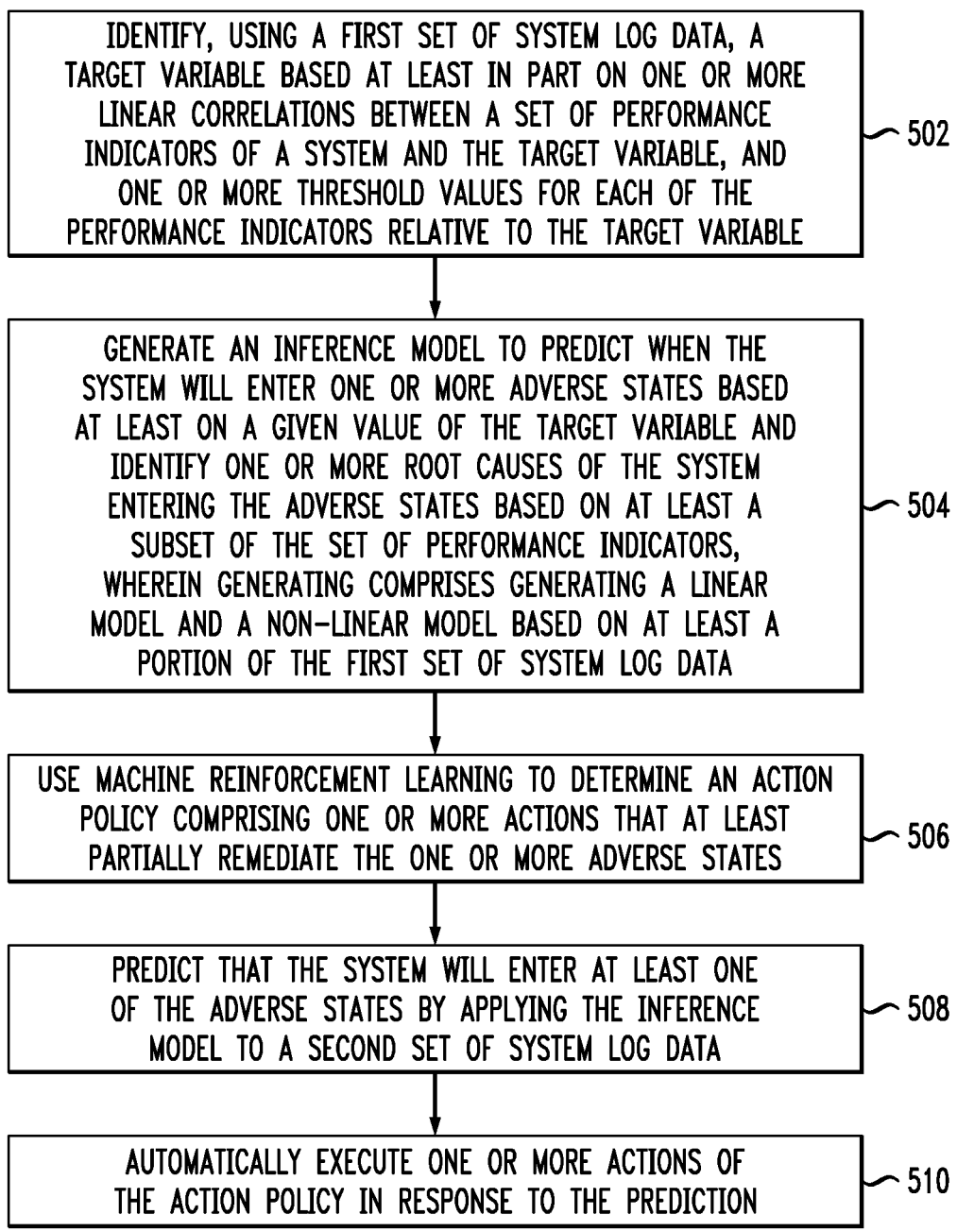
FIG. 5 is a flow diagram of a process for identifying and remediating system anomalies through cognitively assorted machine learning algorithms in an illustrative embodiment.

FIG. 5 is a flow diagram of a process for identifying and remediating system anomalies through cognitively assorted machine learning algorithms in an illustrative embodiment. It is to be understood that this particular process is only an example, and additional or alternative processes can be carried out in other embodiments.

In the embodiment depicted in FIG. 5, the process includes steps 502 through 510. These steps are assumed to be performed by the processor 120 utilizing, at least in part, its modules 130, 132, 134 and 136.

Step 502 includes identifying, using a first set of system log data, a target variable based at least in part on one or more linear correlations between a set of performance indicators of a system and the target variable, and one or more threshold values for each of the performance indicators relative to the target variable. The system may include a distributed file system. The set of performance indicators may include one or more of: at least one performance indicator corresponding to usage of a processor; at least one performance indicator corresponding to availability of a processor; at least one performance indicator corresponding to a response time; at least one performance indicator corresponding to a number of timeouts associated with a service-oriented architecture platform; and at least one performance indicator corresponding to a number of errors associated with a service-oriented architecture platform.

Step 504 includes generating an inference model to (i) predict when the system will enter one or more adverse states based at least on a given value of the target variable and (ii) identify one or more root causes of the system entering the adverse states based on at least a subset of the set of performance indicators, wherein generating comprises generating a linear model and a non-linear model based on at least a portion of the first set of system log data. Generating the linear model may include implementing logistic regression analysis based at least in part on the target variable and at least a subset of the performance indicators using the first set of system log data. Also, generating the non-linear model may include implementing a random forest of decision trees for at least a subset of the performance indicators using the first set of system log data. The one or more adverse states may affect one or more of performance and availability of the system.

Step 506 includes using machine reinforcement learning to determine an action policy comprising one or more actions that at least partially remediate the one or more adverse states.

Step 508 includes predicting that the system will enter at least one of the adverse states by applying the inference model to a second set of system log data. The first set of system log data and the second set of system log data may include one or more events, and wherein predicting may include determining a state of the system for each of the one or more events. The first set of system log data and the second set of system log data may include at least one of: data from a log corresponding to at least one application implemented on a SOA platform of the system; and data from a log from at least one virtual machine corresponding to the system.

Step 510 includes automatically executing one or more actions of the action policy in response to the prediction.

Additionally, the techniques depicted in FIG. 5 may include using the machine reinforcement learning to update the action policy in response to performance of one of the actions. Further, the techniques depicted in FIG. 5 may include determining the one or more threshold values by applying a k-means algorithm for each performance indicator to the first set of system log data.

Also, the techniques depicted in FIG. 5 may include labeling the first set of system log data based at least in part on the determined one or more threshold values to create a training dataset, wherein generating the linear model and the non-linear model comprises training the linear model and the non-linear model using at least a portion of the training dataset.

Further, the techniques depicted in FIG. 5 may additionally include outputting an identification of one or more of the root causes corresponding to the at least one adverse state associated with the prediction.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to use reinforcement machine learning to determine remediation actions that can automatically be applied when a system anomaly is predicted. These and other embodiments can effectively identify system anomalies and provide corresponding root cause analysis to facilitate increased reliability in system availability.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
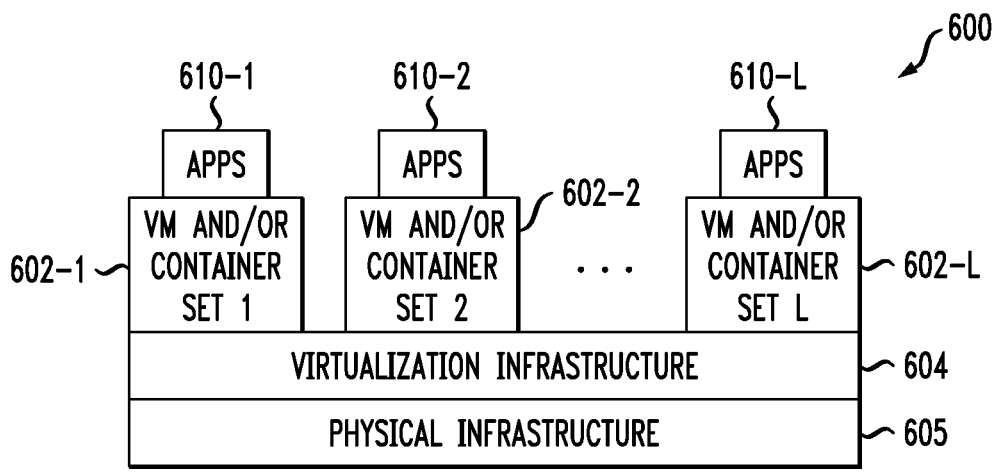
FIGS. 6 and 7 show examples of processing platforms that may be utilized to implement at least a portion of an information processing system in illustrative embodiments.
Figure 7:
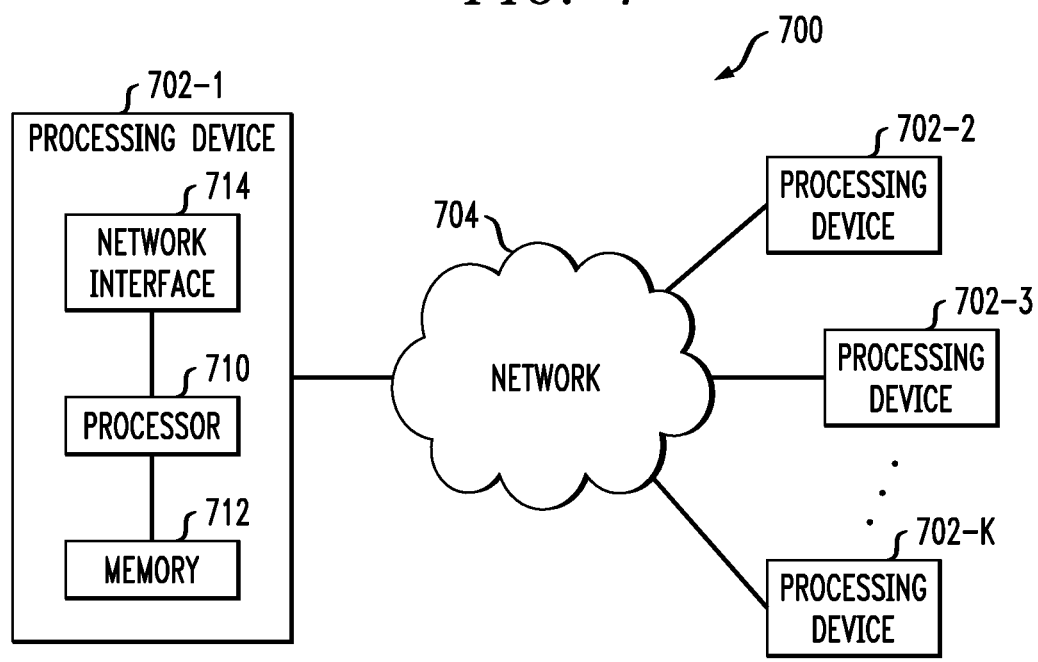

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple VMs and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform used to implement a hypervisor within the virtualization infrastructure 604 is the VMware® vSphere® which has an associated virtual infrastructure management system such as the VMware® vCenter™. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices. For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
identifying, using a first set of system log data, a target variable based at least in part on (i) one or more linear correlations between a set of performance indicators of a system and the target variable, and (ii) one or more threshold values for each of the performance indicators relative to the target variable;
generating an inference model to (i) predict when the system will enter one or more adverse states based at least on a given value of the target variable and (ii) identify one or more root causes of the system entering the one or more adverse states based on at least a subset of the set of performance indicators, wherein said generating comprises:
generating a linear model by implementing logistic regression analysis based at least in part on the target variable and the at least a subset of the performance indicators using the first set of system log data;
generating a non-linear model by implementing a random forest of decision trees for the at least a subset of the performance indicators using the first set of system log data; and
combining the linear model and the non-linear model, to form the inference model, using at least one ensemble modeling technique;
using machine reinforcement learning to determine an action policy comprising one or more actions that at least partially remediate the one or more adverse states;
predicting that the system will enter at least one of the adverse states by applying the inference model to a second set of system log data; and
automatically executing one or more actions of the action policy in response to said predicting;
wherein the method is performed by at least one processing device comprising a processor coupled to a memory.

2. The computer-implemented method of claim 1, further comprising:
determining the one or more threshold values by applying a k-means algorithm for each performance indicator to the first set of system log data.

3. The computer-implemented method of claim 2, further comprising:
labeling the first set of system log data based at least in part on the determined one or more threshold values to create a training dataset, wherein generating the linear model and the non-linear model comprises training the linear model and the non-linear model using at least a portion of the training dataset.

4. The computer-implemented method of claim 1, wherein the first set of system log data and the second set of system log data comprise one or more events, and wherein said predicting comprises determining a state of the system for each of the one or more events.

5. The computer-implemented method of claim 4, wherein the first set of system log data and the second set of system log data comprise at least one of:
  data from a log corresponding to at least one application implemented on a service-oriented architecture (SOA) platform of the system; and
  data from a log from at least one virtual machine corresponding to the system.

6. The computer-implemented method of claim 1, further comprising:
  using the machine reinforcement learning to update the action policy in response to performance of at least one of the actions.

7. The computer-implemented method of claim 1, wherein the system comprises a distributed file system.

8. The computer-implemented method of claim 1, wherein the one or more adverse states affect one or more of availability and performance of the system.

9. The computer-implemented method of claim 1, wherein the set of performance indicators comprises one or more of:
  at least one performance indicator corresponding to usage of a processor;
  at least one performance indicator corresponding to availability of a processor;
  at least one performance indicator corresponding to a response time;
  at least one performance indicator corresponding to a number of timeouts associated with a service-oriented architecture platform; and
  at least one performance indicator corresponding to a number of errors associated with a service-oriented architecture platform.

10. The computer-implemented method of claim 1, further comprising:
  outputting an identification of one or more of the root causes corresponding to the at least one adverse state associated with said predicting.

11. A non-transitory processor-readable storage medium having stored therein program code of one or more software programs, wherein the program code when executed by at least one processing device causes the at least one processing device:
  to identify, using a first set of system log data, a target variable based at least in part on (i) one or more linear correlations between a set of performance indicators of a system and the target variable, and (ii) one or more threshold values for each of the performance indicators relative to the target variable;
  to generate an inference model to (i) predict when the system will enter one or more adverse states based at least on a given value of the target variable and (ii) identify one or more root causes of the system entering the one or more adverse states based on at least a subset of the set of performance indicators, wherein said generating comprises:
    generating a linear model by implementing logistic regression analysis based at least in part on the target variable and the at least a subset of the performance indicators using the first set of system log data;
    generating a non-linear model by implementing a random forest of decision trees for the at least a subset of the performance indicators using the first set of system log data; and
    combining the linear model and the non-linear model, to form the inference model, using at least one ensemble modeling technique;
  to use machine reinforcement learning to determine an action policy comprising one or more actions that at least partially remediate the one or more adverse states;
  to predict that the system will enter at least one of the adverse states by applying the inference model to a second set of system log data; and
  to automatically execute one or more actions of the action policy in response to said prediction.

12. The non-transitory processor-readable storage medium of claim 11, wherein the program code when executed by at least one processing device causes the at least one processing device:
  to determine the one or more threshold values by applying a k-means algorithm for each performance indicator to the first set of system log data.

13. The non-transitory processor-readable storage medium of claim 11, wherein the program code when executed by at least one processing device causes the at least one processing device:
  to use the machine reinforcement learning to update the action policy in response to performance of at least one of the actions.

14. An apparatus comprising:
  at least one processing device comprising a processor coupled to a memory;
  the at least one processing device being configured:
    to identify, using a first set of system log data, a target variable based at least in part on (i) one or more linear correlations between a set of performance indicators of a system and the target variable, and (ii) one or more threshold values for each of the performance indicators relative to the target variable;
    to generate an inference model to (i) predict when the system will enter one or more adverse states based at least on a given value of the target variable and (ii) identify one or more root causes of the system entering the one or more adverse states based on at least a subset of the set of performance indicators, wherein said generating comprises:
      generating a linear model by implementing logistic regression analysis based at least in part on the target variable and the at least a subset of the performance indicators using the first set of system log data;
      generating a non-linear model by implementing a random forest of decision trees for the at least a subset of the performance indicators using the first set of system log data; and
      combining the linear model and the non-linear model, to form the inference model, using at least one ensemble modeling technique;
    to use machine reinforcement learning to determine an action policy comprising one or more actions that at least partially remediate the one or more adverse states;
    to predict that the system will enter at least one of the adverse states by applying the inference model to a second set of system log data; and
    to automatically execute one or more actions of the action policy in response to said prediction.

15. The apparatus of claim 14, wherein the at least one processing device being further configured:
to determine the one or more threshold values by applying a k-means algorithm for each performance indicator to the first set of system log data.

16. The apparatus of claim 14, wherein the first set of system log data and the second set of system log data comprise one or more events, and wherein said predicting comprises determining a state of the system for each of the one or more events.

17. The apparatus of claim 16, wherein the first set of system log data and the second set of system log data comprise at least one of:
data from a log corresponding to at least one application implemented on a service-oriented architecture (SOA) platform of the system; and
data from a log from at least one virtual machine corresponding to the system.

18. The apparatus of claim 14, wherein the system comprises a distributed file system.

19. The apparatus of claim 14, wherein the one or more adverse states affect one or more of availability and performance of the system.

20. The apparatus of claim 14, wherein the set of performance indicators comprises one or more of:
at least one performance indicator corresponding to usage of a processor;
at least one performance indicator corresponding to availability of a processor;
at least one performance indicator corresponding to a response time;
at least one performance indicator corresponding to a number of timeouts associated with a service-oriented architecture platform; and
at least one performance indicator corresponding to a number of errors associated with a service-oriented architecture platform.

* * * * *